(12) United States Patent
Taira

(10) Patent No.: US 7,121,734 B2
(45) Date of Patent: Oct. 17, 2006

(54) FERRULE

(75) Inventor: Junji Taira, Chiba (JP)

(73) Assignee: Seikoh Giken Co., Ltd., (JP)

( * ) Notice: Subject to any disclaimer, the term of this patent is extended or adjusted under 35 U.S.C. 154(b) by 0 days.

(21) Appl. No.: 10/267,368

(22) Filed: Oct. 9, 2002

(65) Prior Publication Data
US 2003/0081909 A1 May 1, 2003

(51) Int. Cl.
*G02B 6/36* (2006.01)
(52) U.S. Cl. .......................... 385/78; 385/80
(58) Field of Classification Search .................. 385/78, 385/80, 81
See application file for complete search history.

(56) References Cited

U.S. PATENT DOCUMENTS

| | | | | |
|---|---|---|---|---|
| 4,490,006 A | * | 12/1984 | Lidholt | 385/78 |
| 5,375,183 A | * | 12/1994 | Edwards et al. | 385/60 |
| 6,158,900 A | * | 12/2000 | Omiya et al. | 385/78 |
| RE37,079 E | * | 3/2001 | Stephenson et al. | 385/78 |
| RE37,080 E | * | 3/2001 | Stephenson et al. | 385/78 |
| 6,357,933 B1 | * | 3/2002 | Bradley et al. | 385/81 |
| 6,402,392 B1 | * | 6/2002 | Yarita et al. | 385/84 |
| 6,595,697 B1 | * | 7/2003 | Hirabayashi et al. | 385/78 |
| 6,607,306 B1 | * | 8/2003 | Ozeki et al. | 385/78 |
| 6,619,856 B1 | * | 9/2003 | Lampert et al. | 385/78 |
| 6,663,293 B1 | * | 12/2003 | Lampert et al. | 385/78 |
| 6,709,167 B1 | * | 3/2004 | Ishibashi et al. | 385/78 |

FOREIGN PATENT DOCUMENTS

| | | |
|---|---|---|
| JP | 61294405 | 12/1986 |
| JP | 02064606 | 3/1990 |
| JP | 05134141 | 5/1993 |
| JP | 07124855 | 5/1995 |
| JP | 09015449 | 1/1997 |
| JP | 01141957 | 5/2001 |

\* cited by examiner

*Primary Examiner*—Thanh-Tam Le
(74) *Attorney, Agent, or Firm*—Adams & Wilks

(57) ABSTRACT

A ferrule has a cylindrical body constructed from a single piece of material and having an outer circumferential surface. A first insertion hole of the cylindrical body is bounded by a first inner surface of the cylindrical body and is configured to receive therein a first preselected portion of an optical fiber so that the first preselected portion of the optical fiber is in direct contact with the first inner surface of the cylindrical body. A second insertion hole of the cylindrical body is disposed in communication with the first insertion hole. The second insertion hole is bounded by a second inner surface of the cylindrical body and is configured to receive therein a second preselected portion of the optical fiber enclosed in a buffer coating so that the second preselected portion of the optical fiber is in direct contact with the second inner surface of the cylindrical body. A flange member separate and independent from the cylindrical body is connected directly to the outer circumferential surface of the cylindrical body.

22 Claims, 12 Drawing Sheets

F I G. 3
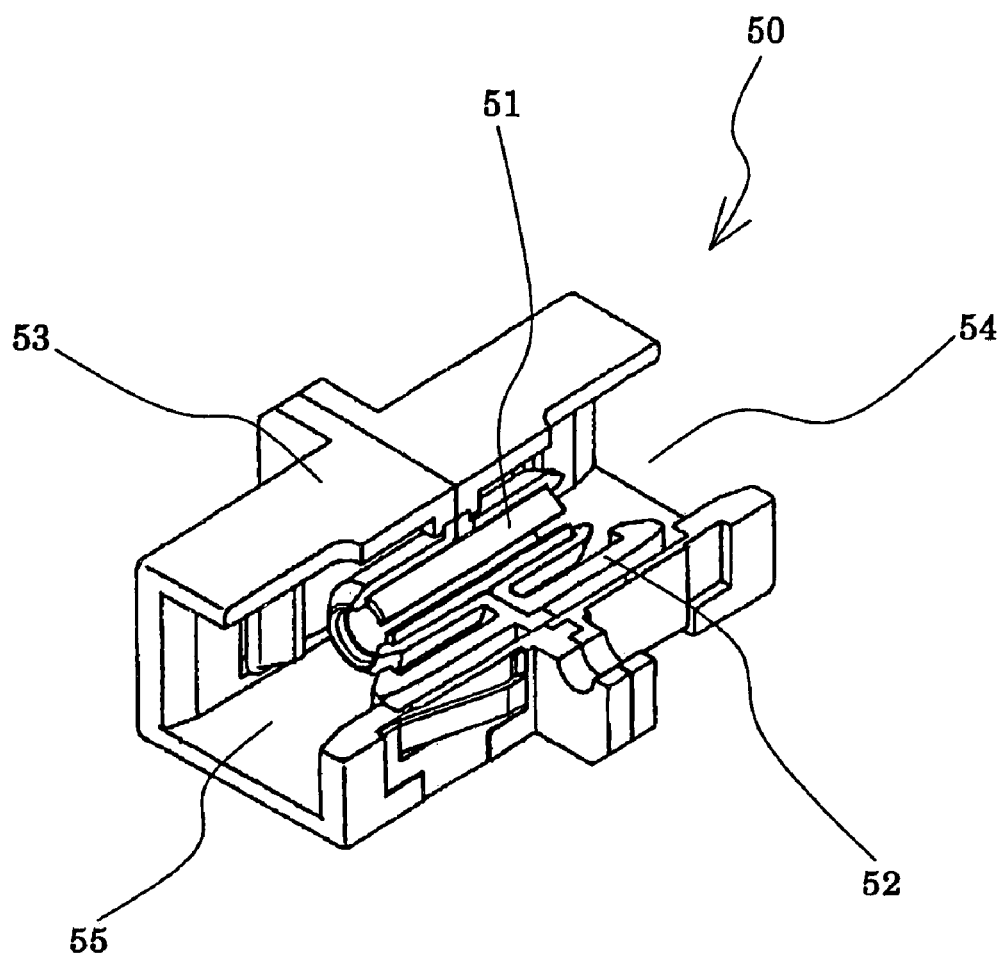

FERRULE

BACKGROUND OF THE INVENTION

1. Field of the Invention

The present invention relates to a ferrule as one portion of a plug side constituting an optical connector for making an optical connection.

2. Background Information

In the optical connector used in the optical connection of an optical fiber used in communication, etc., the optical fiber is inserted and fixed into the ferrule processed with respect to inside and outside diameters with high accuracy. Thereafter, the end face of a connecting portion of the optical fiber is polished in a convex spherical surface shape, and the optical connection is made by making the optical fibers come in physical contact with each other.

In the ferrule for inserting and holding such an optical fiber, there is a structure constructed by a cylindrical member, a cylindrical body for the ferrule arranged within the cylindrical member, and a flange member fixed to only the outer circumferential face of the cylindrical member.

Here, the conventional ferrule for inserting and holding the optical fiber will be explained in detail. FIG. 12 is a sectional view of the ferrule in the prior art.

As shown in FIG. 12(a), the ferrule 100 has a cylindrical member 110 having a through hole 101 extending therethrough in the axial direction, a cylindrical body 120 for the ferrule fitted to the side of a tip portion of the through hole 101 arranged in the cylindrical member 110 and inserting and holding the optical fiber, and a flange member 130 fixed to only the outer circumferential face of the cylindrical member 110.

For example, the cylindrical member 110 is formed by a metal such as stainless steel, etc., and the through hole 101 is formed in the cylindrical member 110 over the axial direction.

An insertion hole 102 of the cylindrical body for the ferrule for inserting and fixing the cylindrical body 120 for the ferrule by press fitting is formed on the tip portion side of this through hole 101. An optical buffered fiber insertion hole 103 for inserting and holding an optical buffered fiber formed by coating the outer circumference of the optical fiber is formed on the side of a rear end portion of the through hole 101.

The cylindrical body 120 for the ferrule fixed into the through hole 101 of the cylindrical member 110 is formed by hard ceramic and glass such as zirconia, etc. An optical fiber insertion hole 121 for inserting and holding the optical fiber is formed in the cylindrical body 120 for the ferrule over the axial direction. A taper portion 122 having an inside diameter gradually increased is arranged on the rear end portion side of this optical fiber insertion hole 121. No tip of the optical fiber inserted from the side of the optical buffered fiber insertion hole 103 abuts on the rear end face of the cylindrical body 120 for the ferrule, etc. by the taper portion 122 so that this tip is easily inserted into the optical fiber insertion hole 121.

The cylindrical member 110 is constructed by a large diameter portion 111 having a large outside diameter on the tip side, and a small diameter portion 112 having an outside diameter smaller than that of the large diameter portion 111 and arranged on the rear end side. A projecting portion 113 is projected in the small diameter portion 112 so as to have an outside diameter approximately equal to that of the large diameter portion 111 over the circumferential direction of the outer circumferential face.

The flange member 130 having a ring shape and fixed to only the outer circumferential face is arranged in this small diameter portion 112. For example, this flange member 130 is formed by a metal such as stainless steel, etc.

A through hole 131 is extended through this flange member 130 over the axial direction. A large diameter through hole 131a having an inside diameter slightly larger than the outside diameter of the projecting portion 113 is arranged on one end portion side of the through hole 131. A small diameter through hole 131b having an inside diameter slightly larger than the small diameter portion 112 of the cylindrical member 110 and slightly larger than the outside diameter of the projecting portion 113 is arranged on the other end portion side of the through hole 131. Namely, a step difference portion 131c is formed within the through hole 131 of the flange member 130 by the inside diameter difference between the large diameter through hole 131a and the small diameter through hole 131b.

The flange member 130 is inserted from the large diameter through hole 131a side to the small diameter portion 112 side of the cylindrical member 110. The movement of the flange member 130 onto the large diameter portion 111 side with respect to the cylindrical member 110 is regulated by abutting the step difference portion 131c of the flange member 130 on the projecting portion 113 of the cylindrical member 110.

Thus, the movement of the flange member 130 onto the tip side with respect to the cylindrical member 110 is regulated. Accordingly, for example, when ferrules 100 are used in the optical connector, the tip faces of the ferrules 100 area butted on each other at a predetermined pressure by biasing the flange member 130 of each of the ferrules 100 optically connected by abutting their tip faces on each other on the tip face side. Therefore, it is possible to prevent the flange member 130 from being moved onto the tip face side with respect to the cylindrical member 110.

For example, four key grooves 132 of a concave shape are arranged on the outer circumferential face of the flange member 130, and regulate the movement in the rotating direction when the ferrule 100 is assembled into an unillustrated optical connector, etc. by the key grooves 132.

Such a ferrule 100 can be formed by fixing the cylindrical body 120 for the ferrule to the cylindrical member 110 by pressing fitting and adhesion, and then center-grinding and processing an assembly body constructed by this cylindrical member 110 and the cylindrical body 120 for the ferrule, and further performing centerless finishing and then fixing the flange member 130 by the press fitting and adhesion.

However, a problem exists in that the number of parts is large and cost is high in such a ferrule 100.

A problem also exists in that the ferrule 100 is heavy in weight since the cylindrical member 110 and the flange member 130 almost occupying the ferrule 100 are formed by a metal such as stainless steel, etc.

Further, a problem exists in that the grinding amount is large and a long working time is taken to perform the finishing operation with high accuracy since the center grinding work and the centerless finishing are performed after the cylindrical body 120 for the ferrule and the cylindrical member 110 are assembled.

Therefore, a ferrule constructed by the cylindrical body for the ferrule and the flange member fitted to the rear end portion of this cylindrical body for the ferrule without arranging the cylindrical member 110 is proposed.

As shown in FIG. 12(b), this ferrule 100A has a cylindrical body 120A for the ferrule having an optical fiber insertion hole 121A for inserting and holding an optical fiber and extending through the cylindrical body 120A for the ferrule over the axial direction, and a flange member 130A fitted to the rear end portion of the cylindrical body 120A for the ferrule.

For example, the cylindrical body 120A for the ferrule is constructed by ceramic such as zirconia, etc., and a taper portion 122A having an inside diameter gradually increased is formed in the rear end portion of the optical fiber insertion hole 121A extended and formed in the axial direction.

The flange member 130A is constructed by a metal such as stainless steel, etc., and an optical buffered fiber insertion hole 103A is formed so as to extend through the flange member 130A in the axial direction and be communicated with the optical fiber insertion hole 121A of the cylindrical body 120A for the ferrule.

A flange portion 133 projected in the circumferential direction is integrally arranged in the outer circumference of the flange member 130A, and a key groove 132A is arranged in this flange portion 133.

Such a ferrule 100A can be fixed and formed by fitting and adhering the flange member 130A to the rear end portion of the cylindrical body 120A for the ferrule by press fitting after the center grinding work and the centerless work are made with respect to the cylindrical body 120A for the ferrule.

The ferrule 100A can be made light in weight and reduced in cost by constructing the ferrule 100A by the cylindrical body 120A for the ferrule and the flange member 130A in this way.

Further, a time required to grind the cylindrical body 120A for the ferrule can be shortened by grinding the cylindrical body 120A for the ferrule constructed by a single member.

Since the cylindrical body for the ferrule constructed by such zirconia ceramic is formed by extrusion molding, the optical fiber insertion hole formed in the cylindrical body for the ferrule can be formed over the axial direction approximately at only the uniform inside diameter. However, in recent years, a method for forming the cylindrical body for the ferrule by the extrusion molding of a zirconia compound is established, and the degree of freedom of the shape formation of the optical fiber insertion hole formed in the cylindrical body for the ferrule is increased. Accordingly, the cylindrical body for the ferrule having the inside diameter of a so-called precise nozzle shape can be manufactured.

However, a problem exists in that manufacture cost is high in the ferrule formed by press-fitting and fixing the flange member to the rear end portion of the above cylindrical body for the ferrule since the flange member is formed by cutting a metal such as stainless steel, etc.

A problem also exists in that the ferrule is heavy in weight since the flange member is formed by the metal such as stainless steel, etc.

In consideration of such a situation, an object of the present invention is to provide a ferrule made light in weight and reduced in manufacture cost.

SUMMARY OF THE INVENTION

To solve the above problem, a first mode of the present invention resides in a ferrule comprising a cylindrical body for the ferrule which is constructed by ceramic and has an optical fiber insertion hole for inserting an optical fiber thereinto and also has an optical buffered fiber insertion hole communicated with the optical fiber insertion hole and inserting and holding an optical buffered fiber formed by coating the optical fiber; and a flange member fixed to only the outer circumferential face of the cylindrical body for the ferrule.

A second mode of the present invention resides in the ferrule in which said flange member is fixed to the outer circumferential face of said cylindrical body for the ferrule by press fitting in the first mode.

A third mode of the present invention resides in the ferrule in which said flange member is fixed to the outer circumferential face of said cylindrical body for the ferrule by forming said flange member by molding in the first mode.

A fourth mode of the present invention resides in the ferrule in which a convexo-concave face for non-slip is formed on the outer circumferential face of said cylindrical body for the ferrule for fixing said flange member in any one of the first to third modes.

A fifth mode of the present invention resides in the ferrule in which said flange member is constructed by a plastic material in any one of the first to fourth modes.

A sixth mode of the present invention resides in the ferrule in which said cylindrical body for the ferrule is constructed by a single member in any one of the first to fifth modes.

In any one of the first to fifth modes of the present invention, a seventh mode of the present invention resides in the ferrule in which said cylindrical body for the ferrule is constructed by a cylindrical portion constructed by ceramic, and an adjusting portion arranged on at least one end side of the interior of the cylindrical portion and having a hardness lower than that of the cylindrical portion, and the core center of a tip face of said optical fiber is aligned with the center with the outer circumference of said cylindrical portion as a reference by deforming said adjusting portion.

An eighth mode of the present invention resides in the ferrule in which said cylindrical portion is constructed by ceramic, and said adjusting portion is constructed by a copper-nickel alloy in the seventh mode.

A ninth mode of the present invention resides in the ferrule in which said ceramic is zirconia in any one of the first to eighth modes.

In the present invention, the ferrule can be made light in weight and manufacture cost can be reduced by forming the ferrule by the cylindrical body for the ferrule and the flange member fixed to only the outer circumferential face of the cylindrical body for the ferrule.

BRIEF DESCRIPTION OF THE DRAWINGS

FIG. 3 is a perspective view in which one portion of an adapter in accordance with the embodiment mode 1 of the present invention is notched.

DETAILED DESCRIPTION OF THE PREFERRED EMBODIMENTS

The present invention will next be explained in detail on the basis of the embodiment modes.

(Embodiment Mode 1)

Figure 1A:
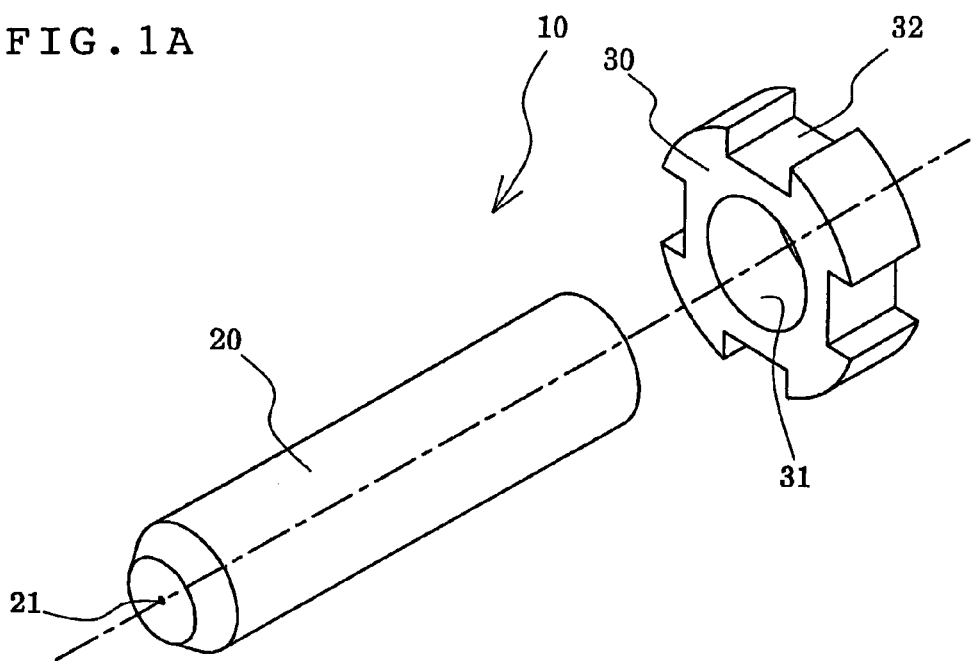
FIG. 1A is an exploded perspective view of a ferrule in accordance with an embodiment mode 1 of the present invention and FIG. 1B is a perspective view in which one portion of this ferrule is notched.
Figure 1B:
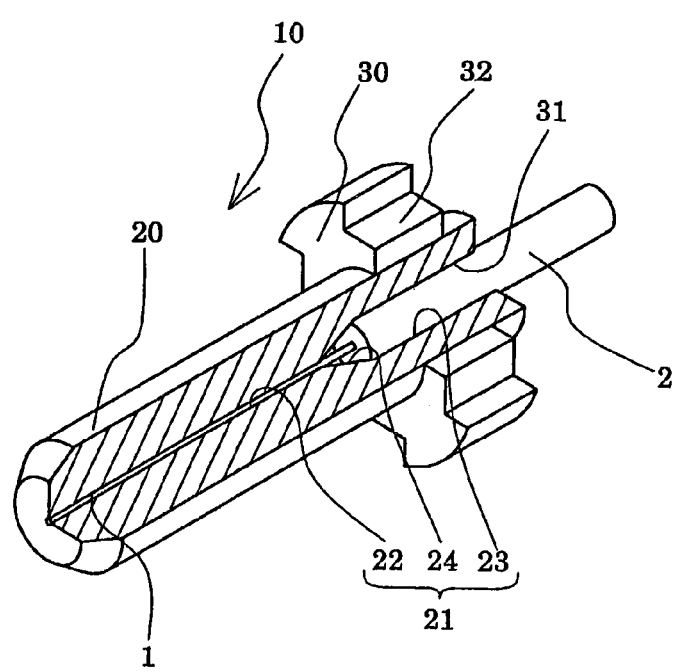

FIG. 1 is an exploded perspective view of a ferrule in accordance with an embodiment mode 1 and a perspective view in which one portion of this ferrule is notched.

As shown in FIG. 1, the ferrule 10 of this embodiment mode is a ferrule 10 for holding the tip of an optical fiber and used in an optical connector plug of an SC type, an FC type, etc. The ferrule 10 has a cylindrical body 20 for the ferrule having 2.5 mm in outside diameter and a flange member 30 fixed to only the outer circumferential face of the cylindrical body 20 for the ferrule.

A through hole 21 is extended through the cylindrical body 20 for the ferrule over the axial direction. An optical fiber insertion hole 22 for inserting and holding the optical fiber 1 is formed on the side of a tip portion of the through hole 21. An optical buffered fiber insertion hole 23 for inserting and holding an optical buffered fiber 2 is formed on the side of a rear end portion of the through hole 21. The outer circumference of the optical fiber 1 having a diameter larger than the optical fiber insertion hole 22 is coated in the optical buffered fiber 2.

A taper portion 24 is arranged between the optical fiber insertion hole 22 and the optical buffered fiber insertion hole 23, and has an inside diameter gradually increased toward the rear end portion side by the inside diameter difference. The optical fiber 1 inserted from the optical buffered fiber insertion hole 23 side is easily inserted into the optical fiber insertion hole 22 by the taper portion 24.

For example, such a cylindrical body 20 for the ferrule is constructed by ceramics such as zirconia, etc.

For example, a flange member 30 fixed to only the outer circumferential face of such a cylindrical body 20 for the ferrule has a ring shape formed by a plastic material. An insertion hole 31 having an inside diameter approximately equal to the outside diameter of the cylindrical body 20 for the ferrule is formed in the flange member 30 over the axial direction.

Further, four key grooves 32 of a concave shape are arranged on the outer circumferential face of the flange member 30 at an equal interval in the circumferential direction.

The ferrule 10 is formed by fixing such a flange member 30 to only the outer circumferential face of the cylindrical body 20 for the ferrule.

The flange member 30 may be fixed to the cylindrical body 20 for the ferrule by press fitting and adhesion, and may be also formed and fixed to the outer circumferential face of the cylindrical body 20 for the ferrule by outsert molding.

Thus, in the ferrule 10 of this embodiment mode, the cylindrical body 20 for the ferrule holds the optical fiber 1 and the optical buffered fiber 2, and the flange member 30 is fixed to only the outer circumferential face of the cylindrical body 20 for the ferrule. Therefore, the flange member 30 can be made light in weight so that the ferrule 10 can be made light in weight and manufacture cost can be reduced.

The ferrule 10 can be further made light in weight and reduced in cost by forming the flange member 30 by a plastic material.

The ferrule 10 of this embodiment mode is a ferrule 10 used in the optical connector of an SC type, an FC type, etc. for holding the tip of the optical fiber 1 and making the optical connection, and using the cylindrical body 20 for the ferrule having 2.5 mm in outside diameter.

Figure 2A:
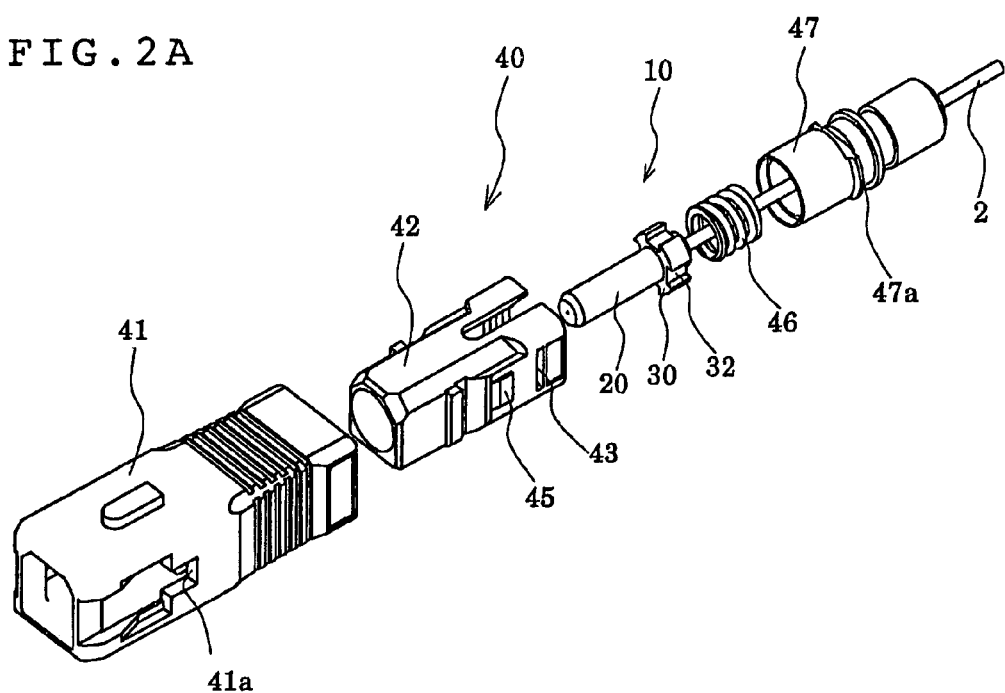
FIG. 2A is an exploded perspective view and FIG. 2B is a sectional view of an optical connector plug in accordance with the embodiment mode 1 of the present invention.
Figure 2B:
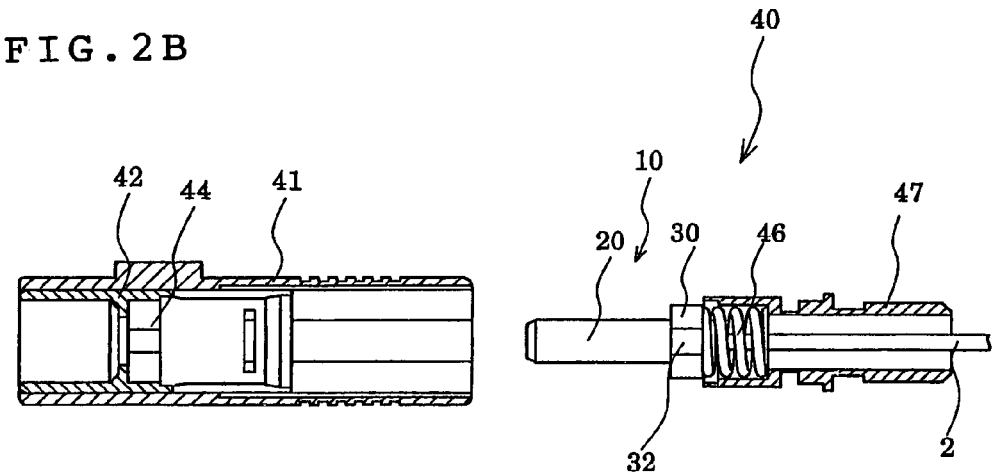

Here, the SC type optical connector will be explained as one example of the optical connector. FIG. 2 is an exploded perspective view and a sectional view of an optical connector plug in accordance with the embodiment mode 1. FIG. 3 is a perspective view in which one portion of an adapter is notched.

The optical connector shown in FIGS. 2 and 3 is the SC type optical connector. This SC type optical connector is constructed by an SC type optical connector plug 40 having the above ferrule 10 described in the embodiment mode 1, and an adapter 50 for the SC type optical connector for fitting the SC type optical connector plug 40 from both opposite sides thereof.

As shown in FIG. 2, this SC type optical connector plug 40 has a plug housing 41 fitted to the adapter 50 for the SC type optical connector, and a plug frame 42 fitted into this plug housing 41. The ferrule 10 constructed by the above cylindrical body 20 for the ferrule and the flange member 30, a compression spring 46 mounted to an outer circumferential portion of the rear end of the cylindrical body 2 of or the ferrule, and a stopper 47 fitted to the rear end of the cylindrical body 20 for the ferrule through this compression spring 46 are arranged within this plug frame 42. Namely, the compression spring 46 is nipped between the flange member 30 and the stopper 47.

The ferrule 10 holding the optical fiber, and the compression spring 46 and the stopper 47 inserted into the optical buffered fiber 2 in advance are sequentially inserted into the plug frame 42. An engaging claw 47a of the stopper 47 is engaged with an engaging hole 43 of the plug frame 42. Thus, this stopper 47 is fixed to the plug frame 42, and the ferrule 10 is biased and held within the plug frame 42 in the axial direction through the compression spring 46. The rotation of the ferrule 10 held within the plug frame 42 is regulated by engaging the key grooves 32 formed in the flange member 30 with four engaging projecting portions 44 arranged in the plug frame 42.

An engaging convex portion 45 engaged with the plug housing 41 is arranged in the outer circumference of the plug frame 42. The plug frame 42 is held within the plug housing 41 by engaging the engaging convex portion 45 with an engaging concave portion 41a of the plug housing 41.

On the other hand, as shown in FIG. 3, a sleeve 51 for the optical connection for optically connecting the optical fibers 1 to each other by oppositely aligning the ferrules 10 building the optical fibers 1 therein is built in the adapter 50 for the SC type optical connector. Further, the sleeve 51 for the optical connection is held by a sleeve holder 52 divided into two in the axial direction. This sleeve holder 52 is held by a housing 53 divided into two in the axial direction.

The optical connection can be made by inserting the SC type optical connector plug 40 having the above ferrule 10 from both opening portions 54 and 55 of such an adapter 50 for the SC type optical connector, and abutting the end faces of the ferrules 10 on each other within the sleeve 51 for the optical connection.

(Embodiment Mode 2)

In the above embodiment mode 1, the ferrule 10 used in the optical connector plug of the SC type, etc. having the cylindrical body 20 for the ferrule having 2.5 mm in outside diameter is illustrated. However, in the embodiment mode 2, a ferrule having the cylindrical body for the ferrule having 1.25 mm in outside diameter, particularly, the ferrule of an MU type optical connector plug is used.

Figure 4A:
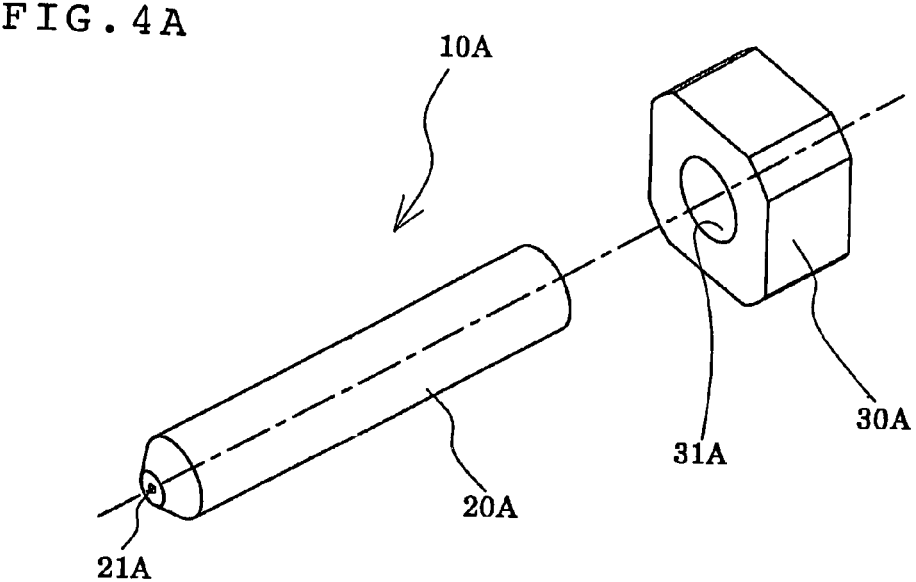
FIG. 4A is an exploded perspective view of a ferrule in accordance with an embodiment mode 2 of the present invention and FIG. 4B is a perspective view in which one portion of this ferrule is notched.
Figure 4B:
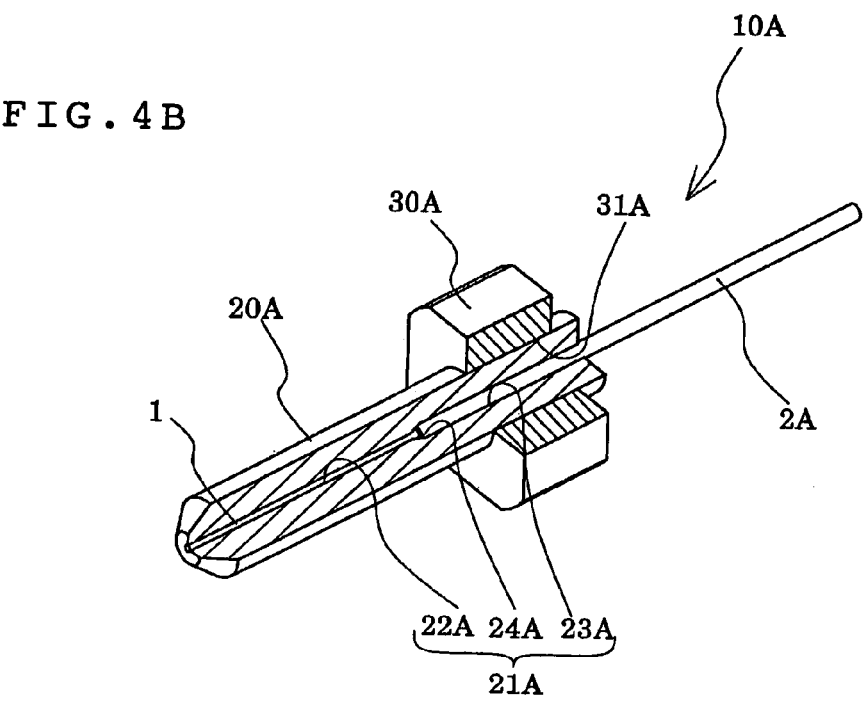

FIG. 4 is an exploded perspective view of the ferrule in accordance with the embodiment mode 2 and a perspective view in which one portion of this ferrule is notched.

The ferrule 10A shown in FIG. 4 is a ferrule 10A arranged in the MU type optical connector plug, and has a cylindrical body 20A for the ferrule having 1.25 mm in outside diameter and constructed by zirconia, and a flange member 30A fixed to only the outer circumferential face of this cylindrical body 20A for the ferrule.

The cylindrical body 20A for the ferrule has an outside diameter smaller than that of the cylindrical body 20 for the ferrule in the above embodiment mode 1, and a through hole 21A is extended through this cylindrical body 20A for the ferrule over the axial direction.

An optical fiber insertion hole 22A for inserting and holding the optical fiber 1 is formed on the side of a tip portion of this through hole 21A. An optical buffered fiber insertion hole 23A for inserting and holding an optical buffered fiber 2A is formed on the side of a rear end portion of the through hole 21A. The outer circumference of the optical fiber 1 is coated in the optical buffered fiber 2A.

A taper portion 24A is arranged between the optical fiber insertion hole 22A and the optical buffered fiber insertion hole 23A, and has an inside diameter gradually increased toward the rear end portion side by an inside diameter difference. The optical fiber 1 inserted from the optical buffered fiber insertion hole 23A side is easily inserted into the optical fiber insertion hole 22A by the taper portion 24A.

With respect to the outside diameter of the optical buffered fiber 2A, the optical buffered fiber 2A has a different thickness in accordance with a coating material, etc. arranged in the outer circumference of the optical fiber 1. However, in this embodiment mode, the optical buffered fiber 2A coated at a predetermined outside diameter or less, e.g., the optical fiber 1 having 125 μm in outside diameter and the optical buffered fiber 2A having 250 μm in outside diameter are used to insert and hold the optical buffered fiber 2A by the optical buffered fiber insertion hole 23A arranged in the rear end portion of the cylindrical body 20A for the ferrule. Namely, the inside diameter of the optical buffered fiber insertion hole 23A is set to an inside diameter such as 300 μm slightly larger than 250 μm.

For example, the flange member 30A fixed to only the outer circumferential face of such a cylindrical body 20A for the ferrule approximately has a rectangular shape in section formed by a plastic material. An insertion hole 31A having an inside diameter approximately equal to the outside diameter of the cylindrical body 20A for the ferrule is formed in the flange member 30A over the axial direction.

Similar to the above embodiment mode 1, the flange member 30A may be fixed to the cylindrical body 20A for the ferrule by press fitting and adhesion, and may be also formed and fixed to the outer circumferential face of the cylindrical body 20A for the ferrule by outsert molding.

The ferrule 10A is inserted into the insertion hole approximately formed in the rectangular shape in section in an unillustrated plug frame in assembly into the MU type optical connector plug even when no key groove is formed in the flange member 30A. Therefore, the movement of the ferrule 10A in its rotating direction can be regulated by forming the flange member 30A in an outer shape approximately set to the rectangular shape in section.

Thus, similar to the above embodiment mode 1, the cylindrical body 20A for the ferrule holds the optical fiber 1 and the optical buffered fiber 2A, and the flange member 30A is fixed to only the outer circumferential face of the cylindrical body 20A for the ferrule as the ferrule 10A assembled into the MU type optical connector plug. Therefore, the flange member 30A can be made light in weight so that the ferrule 10A can be made light in weight and manufacture cost can be reduced.

(Embodiment Mode 3)

The above embodiment mode 2 illustrates the ferrule 10A having the cylindrical body 20A for the ferrule of 1.25 mm in outside diameter assembled into the MU type optical connector plug. However, in the embodiment mode 3, the ferrule for the LC type optical connector will be explained. Members similar to those in the above embodiment mode are designated by the same reference numerals and their overlapping explanations are omitted.

Figure 5A:
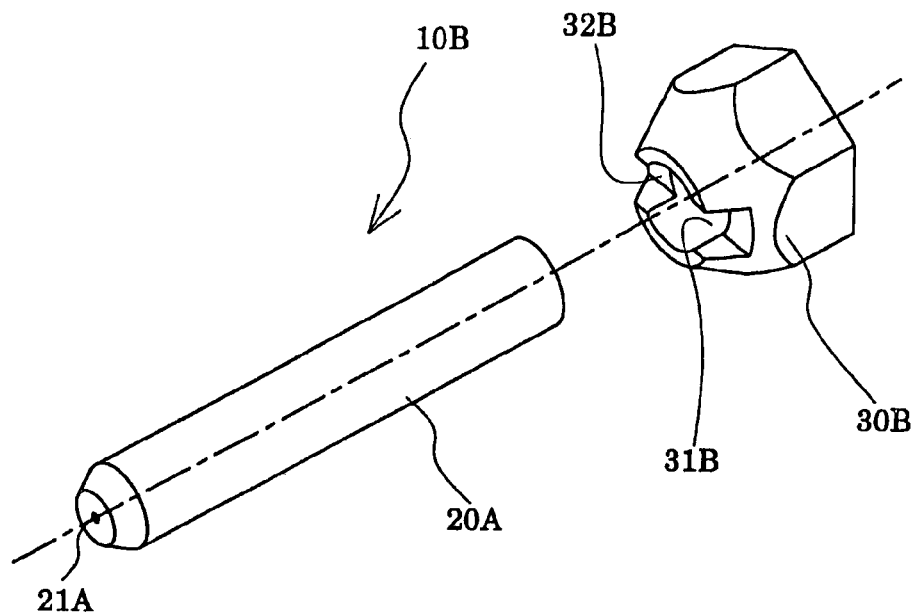
FIG. 5A is an exploded perspective view of a ferrule in accordance with an embodiment mode 3 of the present invention and FIG. 5B is a perspective view in which one portion of this ferrule is notched.
Figure 5B:
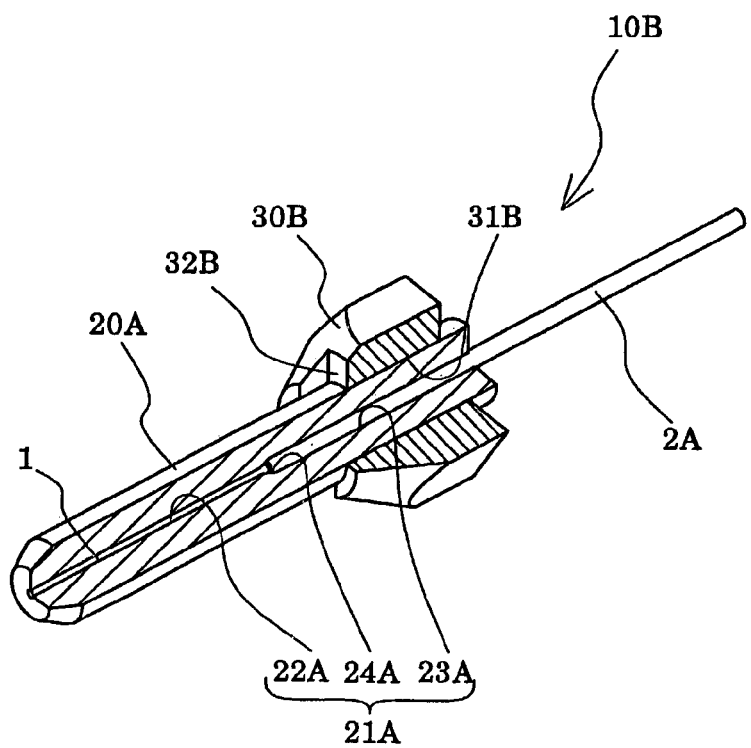

FIG. 5 is an exploded perspective view of the ferrule in accordance with the embodiment mode 3 and a perspective view in which one portion of this ferrule is notched.

The ferrule 10B shown in FIG. 5 is a ferrule 10B assembled into an LC type optical connector plug, and has a cylindrical body 20A for the ferrule having 1.25 mm in outside diameter and constructed by zirconia, and a flange member 30B fixed to only the outer circumferential face of the cylindrical body 20A for the ferrule.

A member similar to that in the embodiment mode 2 is used in the cylindrical body 20A for the ferrule, and its overlapping explanation is therefore omitted.

For example, the flange member 30B fixed to only the outer circumferential face of the cylindrical body 20A for the ferrule approximately has a hexagonal shape in section formed by a plastic material. The side of a tip portion of the flange member 30B is formed in a taper shape.

Two key grooves 32B of a concave shape each engaged with an unillustrated tool for adjusting the position around the central axis of the ferrule 10B every 60° are arranged on the tip face of the flange member 30B when the ferrule 10B is assembled into the LC type optical connector plug.

Even when no key groove is arranged in the flange member 30A, the ferrule 10A is inserted into an insertion hole arranged in an unillustrated plug frame and approximately having a hexagonal shape in section when the ferrule 10A is assembled into the LC type optical connector plug. Therefore, the movement of the ferrule 10A in its rotating direction can be regulated by forming the flange member 30A in an outer shape approximately set to the hexagonal shape in section.

Thus, similar to the above embodiment modes 1 and 2, the cylindrical body 20A for the ferrule holds the optical fiber 1 and the optical buffered fiber 2A and the flange member 30B is fixed to only the outer circumferential face of the cylindrical body 20A for the ferrule as the ferrule 10B assembled into the LC type optical connector plug. Therefore, the flange member 30B can be made light in weight so that the ferrule 10B can be made light in weight and manufacture cost can be reduced.

(Embodiment Mode 4)

Figure 6A:
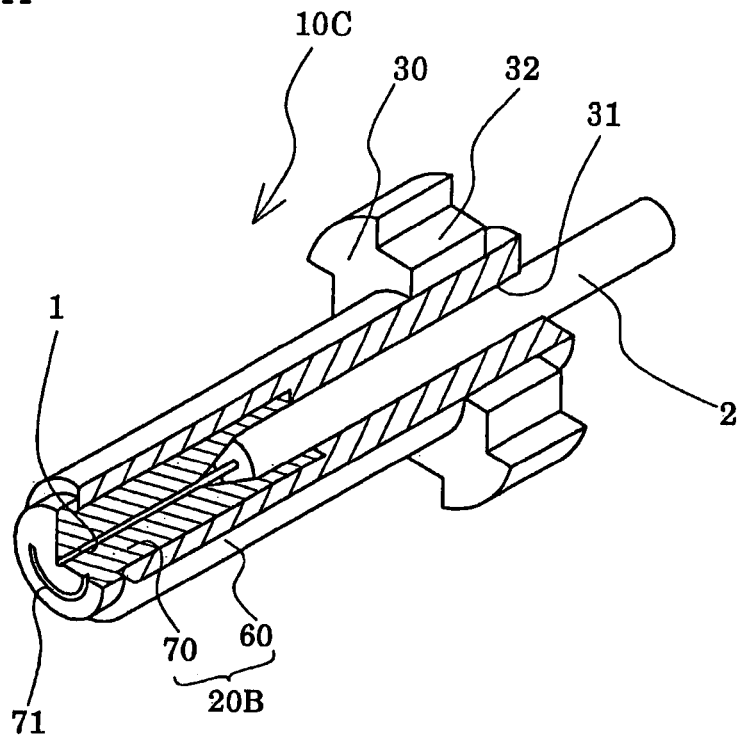
FIG. 6 is a perspective view and a sectional view of a ferrule in accordance with an embodiment mode 4 of the present invention.
Figure 6B:
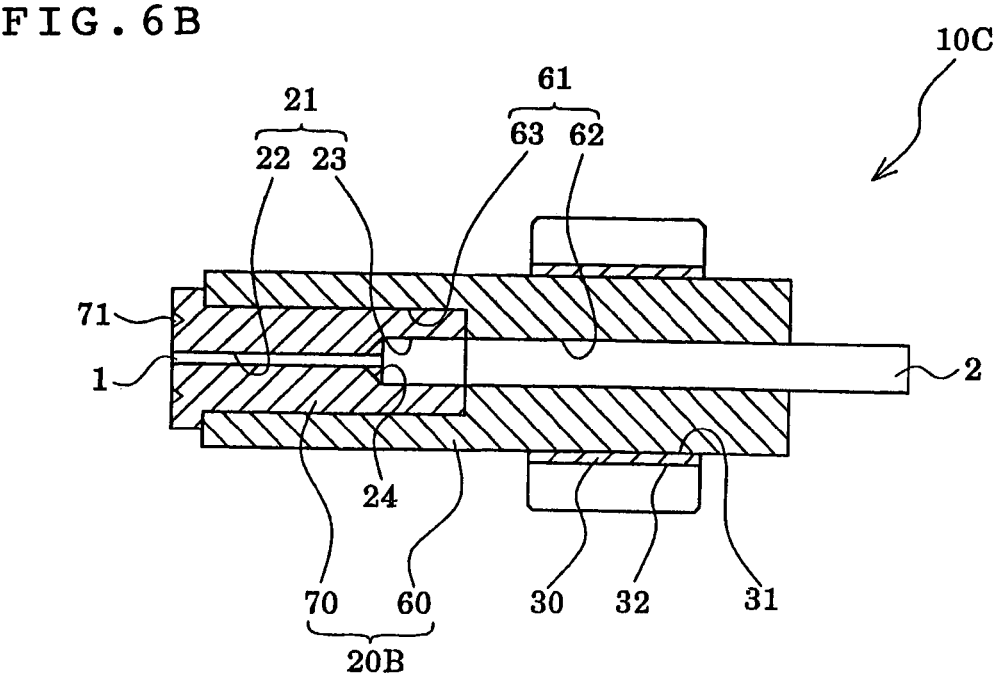
Figure 7:
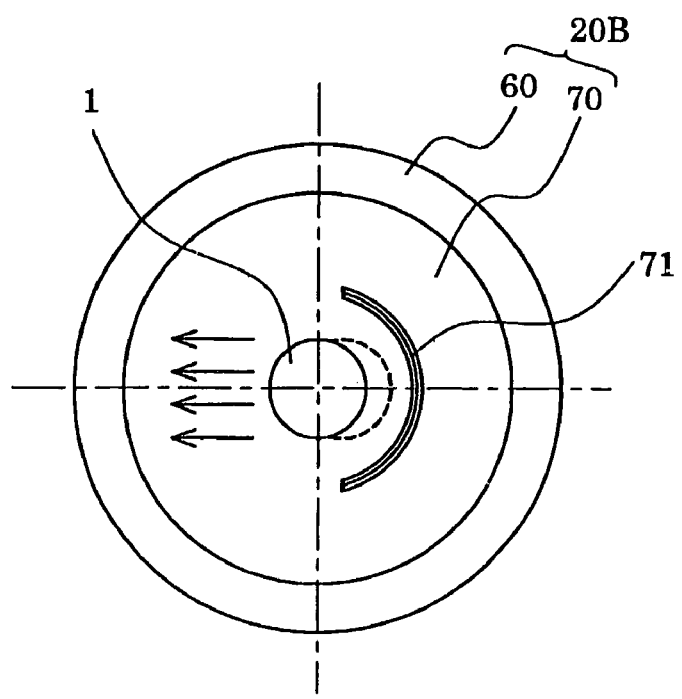
FIG. 7 is a plan view showing an assembly state of the ferrule in accordance with the embodiment mode 4 of the present invention.

FIG. 6 is a perspective view and a sectional view of a ferrule in accordance with an embodiment mode 4 of the present invention. FIG. 7 is a perspective view and a plan view of a main portion showing an assembly state of the ferrule. The same members as the above embodiment modes 1 to 3 are designated by the same reference numerals and their overlapping explanations are omitted.

As shown in these figures, the ferrule 10C of this embodiment mode has a cylindrical body 20B for the ferrule, and a flange member 30 fixed to only the outer circumferential face of the cylindrical body 20B for the ferrule.

Here, the cylindrical body 20B for the ferrule is constructed by a cylindrical portion 60 constructed by ceramic such as zirconia, etc., and an adjusting portion 70 held within the cylindrical portion 60 and formed by a member having a hardness lower than that of the cylindrical portion 60. Thus, the ferrule 20B having the cylindrical portion 60 constructed by ceramic is also a ferrule constructed by ceramic in the present invention.

A holding hole 61 approximately having the same outside diameter over the axial direction is extended through the cylindrical portion 60 over the axial direction.

A first optical buffered fiber insertion hole 62 for inserting and holding the optical buffered fiber 2 formed by coating the outer circumference of the optical fiber 1 is formed on the side of one end portion of this holding hole 61. A large diameter portion 63 having an inside diameter larger than that of the first optical buffered fiber insertion hole 62 is formed on the other end portion side of the holding hole 61.

For example, the cylindrical portion 60 can be set to 2.499 mm and 1.249 mm in outside diameter. With respect to about the same outside diameter of such a cylindrical portion 60 in its axial direction, an error in the outside diameter is preferably set to ±0.5 μm or less over the axial direction when the optical fiber 1 is e.g., a single mode optical fiber. Further, for example, when the optical fiber 1 is a multimode optical fiber, the error in the outside diameter is preferably set to 2.0 μm or less over the axial direction.

Further, the adjusting portion 70 having a hardness lower than that of the cylindrical portion 60 is arranged within the large diameter portion 63 of the holding hole 61 of the cylindrical portion 60.

The adjusting portion 70 is continuously arranged over an opening edge portion of the large diameter portion 63 on the tip face of the cylindrical portion 60 from the interior of the large diameter portion 63 of the cylindrical portion 60. A through hole 21 is extended through the adjusting portion 70 over the axial direction.

This through hole 21 is constructed by a second optical buffered fiber insertion hole 23 arranged on the first optical buffered fiber insertion hole 62 side and having an inside diameter approximately equal to the inside diameter of the first optical buffered fiber insertion hole 62, and an optical fiber insertion hole 22 arranged on the tip face side and inserting and holding the optical fiber 1.

Namely, the optical fiber 1 is inserted and held by the optical fiber insertion hole 22 of the adjusting portion 70, and the optical buffered fiber 2 is inserted and held by the second optical buffered fiber insertion hole 23 of the adjusting portion 70 and the first optical buffered fiber insertion hole 62 of the cylindrical portion 60. Thus, the optical fiber 1 and the optical buffered fiber 2 are held by the cylindrical body 20B for the ferrule.

Such an adjusting portion 70 is not particularly limited if the adjusting portion 70 is formed by a material having a hardness lower than that of the cylindrical portion 60 constructed by ceramic such as zirconia, etc. For example, a copper-nickel alloy is used in the adjusting portion 70 in this embodiment mode.

Thus, the cylindrical body 20B for the ferrule holding the optical fiber 1 presses against the tip face near the optical fiber insertion hole 22 of the adjusting portion 70 by e.g., an unillustrated aligning jig, and a V-groove 71 is formed on the tip face of the adjusting portion 70 in one portion of the periphery of the optical fiber insertion hole 22. Thus, as shown in FIG. 7, the core position of the tip face of the optical fiber 1 can be positioned by deforming the adjusting portion 70 at the center with the outer circumference of the cylindrical portion 60 as a reference.

Thus, when the tip faces of the sleeve-shaped bodies 20B for the ferrule are abutted and are optically connected to each other, the positioning is performed with the outer circumference of the cylindrical body 20B for the ferrule as a reference. Therefore, the core of the optical fiber 1 held by each of the sleeve-shaped bodies 20B for the ferrule abutted on each other can be positioned so that insertion loss can be reduced and the optical connection of high efficiency can be made.

The flange member 30 of this embodiment mode is the same as the above embodiment mode 1, and its overlapping explanation is therefore omitted.

(Embodiment Mode 5)

In the above embodiment mode 1, the optical connector plug using the ferrule 10 is explained as one example. However, no device using the ferrule of the present invention is particularly limited to this optical connector plug.

Figure 8A:
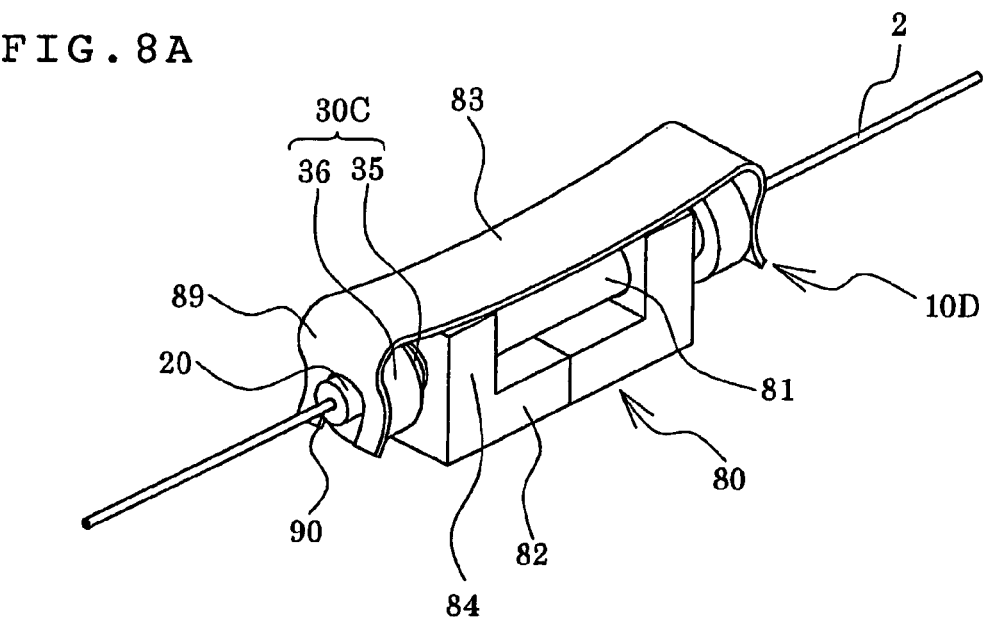
FIG. 8A is a perspective view of an optical connector in accordance with an embodiment mode 5 of the present invention.
Figure 8B:
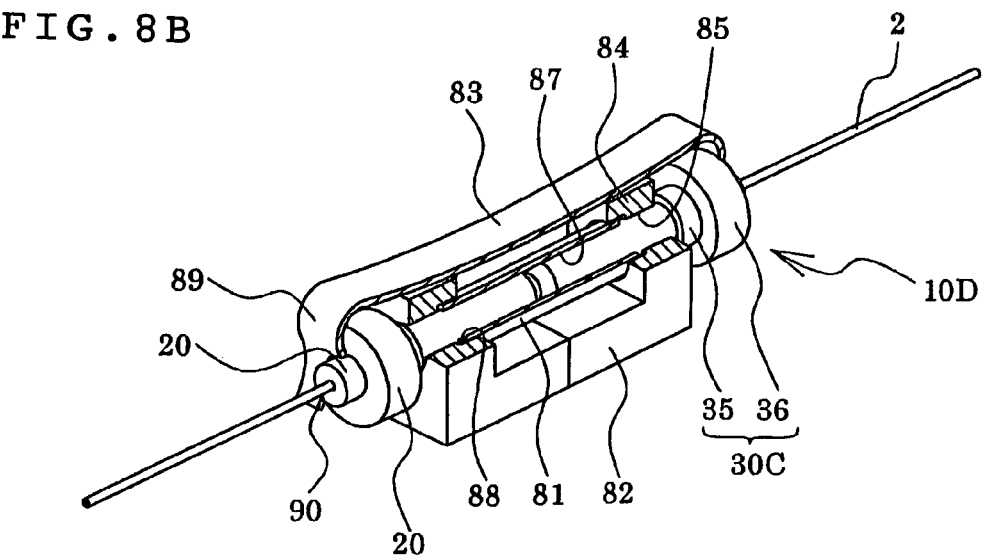
FIG. 8B is a perspective view in which a main portion of the optical connector is notched.
Figure 9A:
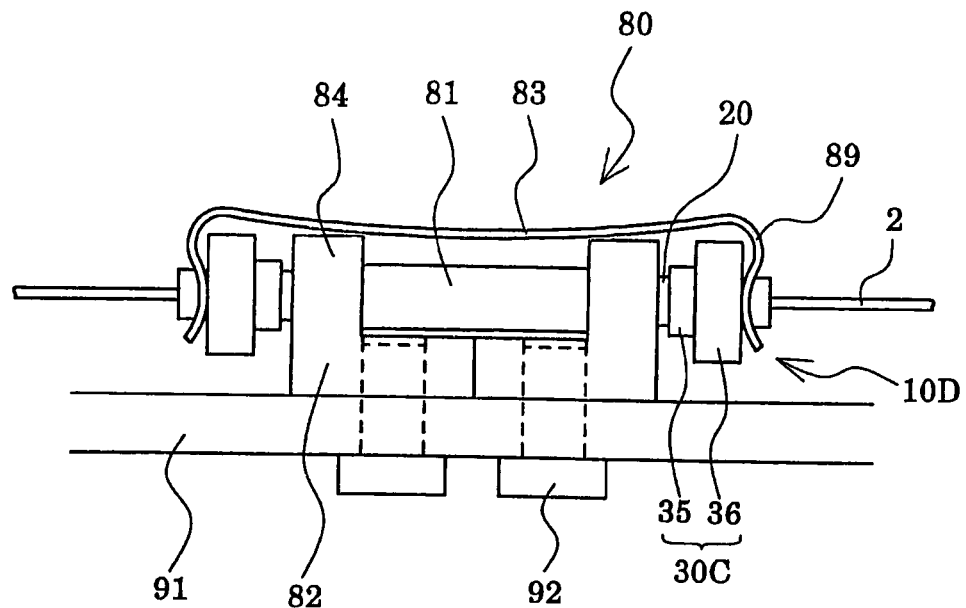
FIG. 9A is a plan view and FIG. 9B is a sectional view of the optical connector in accordance with the embodiment mode 5 of the present invention.
Figure 9B:
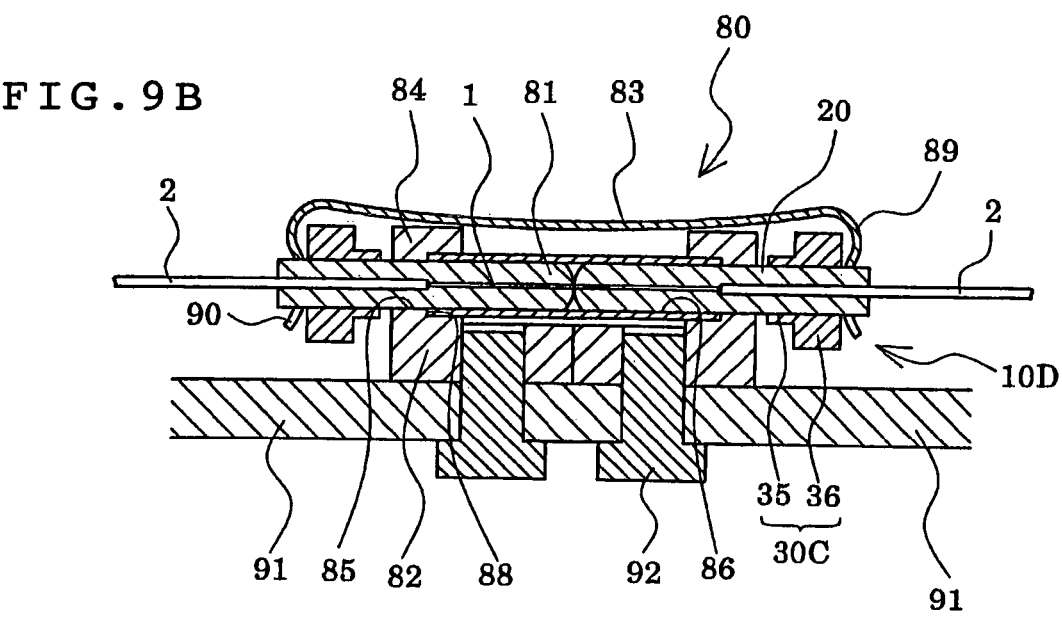

Here, other examples of the optical connector using the ferrule of the present invention will be explained. FIG. 8 is a perspective view of an optical connector in accordance with an embodiment mode 5, and a perspective view in which one portion of this optical connector is notched. FIG. 9 is a plan view and a sectional view of this optical connector. Members similar to those in the above embodiment modes are designated by the same reference numerals, and their overlapping explanations are omitted.

As shown in these figures, the optical connector 80 of this embodiment mode has a sleeve 81 for the optical connection for inserting a ferrule 10D thereinto from both ends of this sleeve 81, an adapter main body 82 for holding the sleeve 81 for the optical connection and fixed to a mounting substrate 91, and a clamp 83 for abutting the tip faces of the ferrules 10D on each other by a predetermined pressing force.

The ferrule 10D is constructed by a cylindrical body 20 for the ferrule and a flange member 30C fixed to only the outer circumferential face of this cylindrical body 20 for the ferrule.

The cylindrical body 20 for the ferrule has a shape similar to that in the above embodiment mode 1, and holds the optical fiber 1 and the optical buffered fiber 2.

The flange member 30C has a disk shape, and no key groove is formed on the outer circumferential face of the flange member 30C. A small diameter disk portion 35 arranged on the tip face side of the cylindrical body 20 for the ferrule and having a small outside diameter, and a large diameter disk portion 36 arranged on the rear end portion side of the cylindrical body 20 for the ferrule and having a diameter larger than the outside diameter of the small diameter disk portion 35 are integrally formed in such a flange member 30C.

Similar to the above embodiment mode 1, the flange member 30C may be fixed to the cylindrical body 20 for the ferrule by press fitting and adhesion, and may be also formed and fixed to the outer circumferential face of the cylindrical body 20 for the ferrule by outsert molding.

On the other hand, the adapter main body 82 has holding portions 84 each having a U-shape and both ends bent oppositely to each other.

A ferrule holding hole 85 having an inside diameter slightly larger than the outside diameter of the cylindrical body 20 for the ferrule is coaxially arranged in each of these two holding portions 84.

The sleeve 81 for the optical connection is nipped by the pair of holding portions 84 between the holding portions 84 of these ferrule holding holes 85.

The sleeve 81 for the optical connection has a ferrule insertion hole 86 having a cylindrical shape and extending through this sleeve 81 over its axial direction, and a slit 87 of one stripe extending through the sleeve 81 over the axial direction on its side face. The ferrule insertion hole 86 is formed so as to have an inside diameter slightly smaller than the outside diameter of the cylindrical body 20 for the ferrule.

The cylindrical body 20 for the ferrule inserted into the ferrule holding hole 85 from each of both end sides of the ferrule insertion hole 86 is inserted into the sleeve 81 for the optical connection so that the optical fibers 1 are optically connected to each other.

At this time, the sleeve 81 for the optical connection is elastically deformed by the insertion of the cylindrical body 20 for the ferrule in a direction for widening the slit 87. Therefore, the cylindrical body 20 for the ferrule can be closely attached to the inner circumferential face of the ferrule insertion hole 86.

Thus, the sleeve-shaped bodies 20 for the ferrule inserted from both the ends of the ferrule insertion hole 86 can be aligned with each other along the inner circumferential face of the ferrule insertion hole 86 so that the optical fibers 1 can be reliably optically connected to each other without any axial shift, etc. Accordingly, when the optical fibers 1 are optically connected to each other, there is no fear that optical characteristics such as insertion loss, etc. are reduced. Namely, stable optical characteristics can be obtained.

For example, zirconia, phosphor bronze, stainless steel, plastic, etc. are used as a material for forming such a sleeve 81 for the optical connection. In this embodiment mode, zirconia is used as this material.

Such a sleeve 81 for the optical connection is arranged within the ferrule holding hole 85 and is abutted on a step difference portion 88 for the sleeve abutted on each of both the end faces of the sleeve 81 for the optical connection. Thus, the sleeve 81 for the optical connection is held in a state in which the movement of the sleeve 81 for the optical connection in the axial direction is regulated.

The adapter main body 82 is divided approximately at the center of the holding portion 84 so that the sleeve 81 for the optical connection can be nipped by the step difference portion 88 for the sleeve.

Further, the tip faces of the pair of ferrules 10D inserted and held in the ferrule holding hole 85 of the adapter main body 82 and the ferrule insertion hole 86 of the sleeve 81 for the optical connection are abutted on each other by a clamp 83 at a predetermined pressure.

The clamp 83 is constructed by a member of a leaf spring shape having a tip portion 89 bent in a U-shape. A notch portion 90 is arranged in a bent tip portion 89. A notch portion 90 for inserting a rear end portion of the ferrule 10D, i.e., only the rear end portion of the cylindrical body 20 for the ferrule thereinto is arranged in the bent tip portion 89.

This notch portion 90 is inserted into the rear end portion of the cylindrical body 20 for the ferrule, and is abutted on the rear end face of the flange member 30C of the ferrule 10D, i.e., the rear end face of the large diameter disk portion 36. Thus, the pair of ferrules 10D are held in a state in which the tip faces of these ferrules 10D are abutted on each other at a predetermined pressure.

Such an optical connector 80 is mounted to the mounting substrate 91 by fixing the adapter main body 82 to the mounting substrate 91 by a fixing member 92 such as a screw, etc.

Thus, in this embodiment mode, the ferrule 10D can be made compact and light in weight by using the optical connector 80 able to directly optically connect the ferrule 10D holding the optical fiber 1 without using the optical connector plug of the above embodiment mode 1. Further, the optical connector 80 can be made compact and light in weight by using the above ferrule 10D made compact and light in weight in the present invention in such an optical connector 80.

(Other Embodiment Modes)

The embodiment modes 1 to 5 of the present invention is explained above, but the basic constructions of the ferrules 10 to 10D are not limited to the above embodiment modes.

For example, non-slip portions may be arranged on the outer circumferential faces for fixing the flange members 30 to 30C of the sleeve-shaped bodies 20, 20A for the ferrule so as not to slip the flange members 30 to 30C.

Figure 10A:
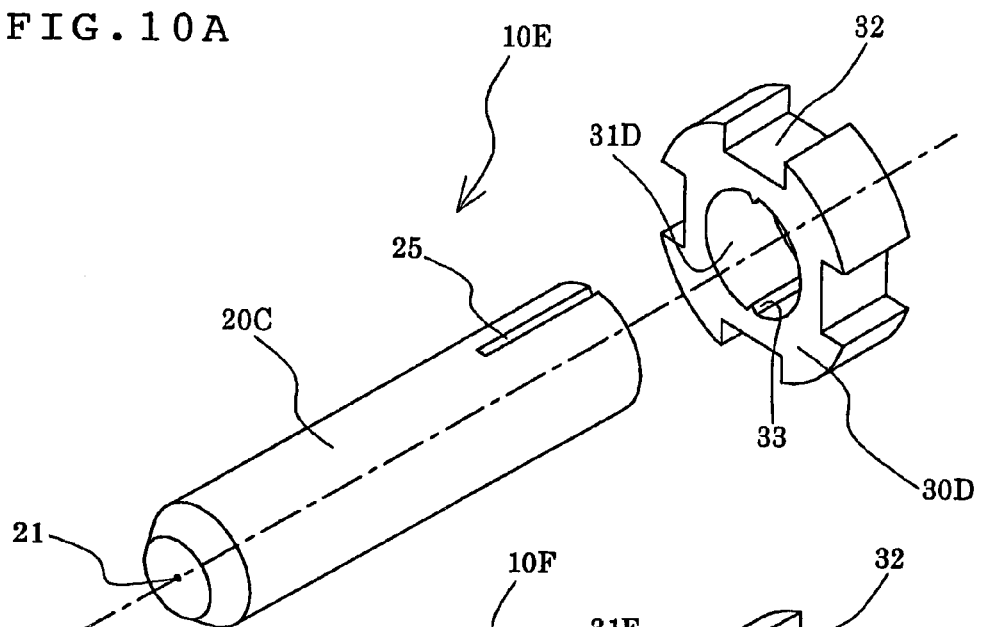
FIGS. 10A–10B are exploded perspective views of a ferrule in accordance with another embodiment mode of the present invention.
Figure 10B:
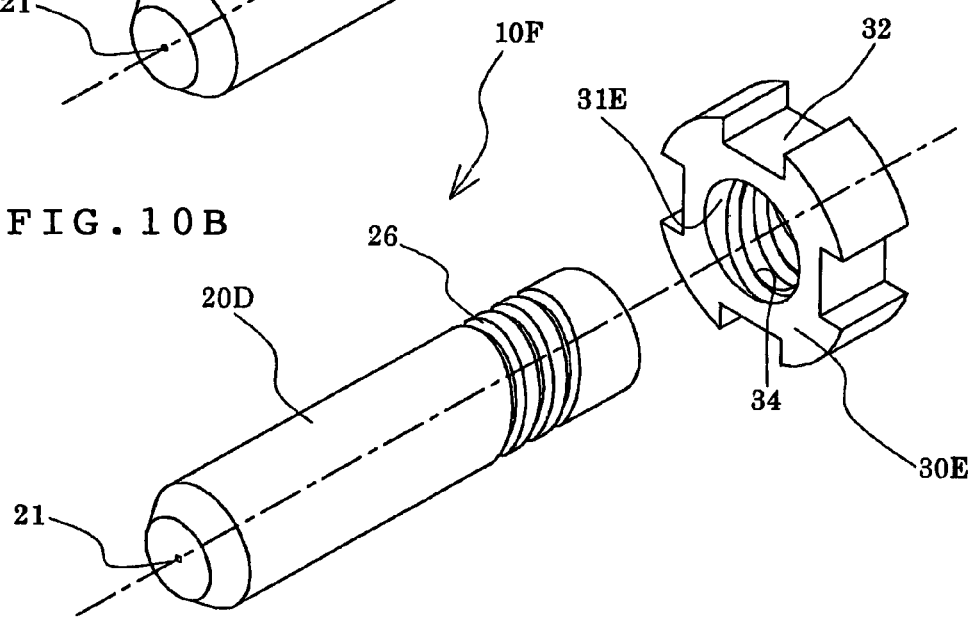
Figure 11:
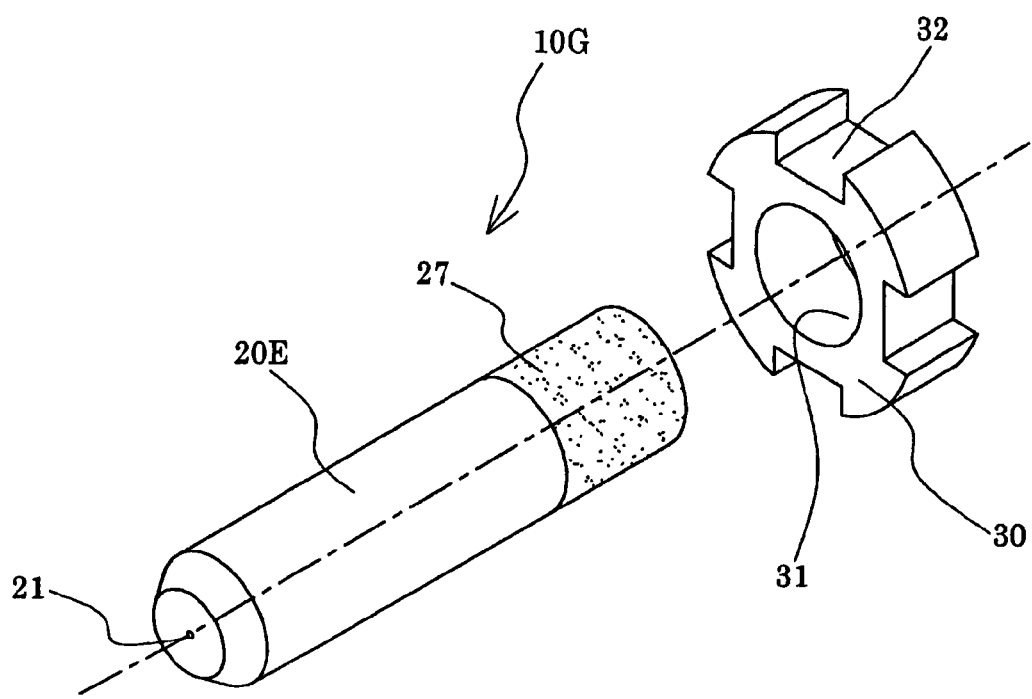
FIG. 11 is an exploded perspective view of a ferrule in accordance with another embodiment mode of the present invention.
Figure 12A:
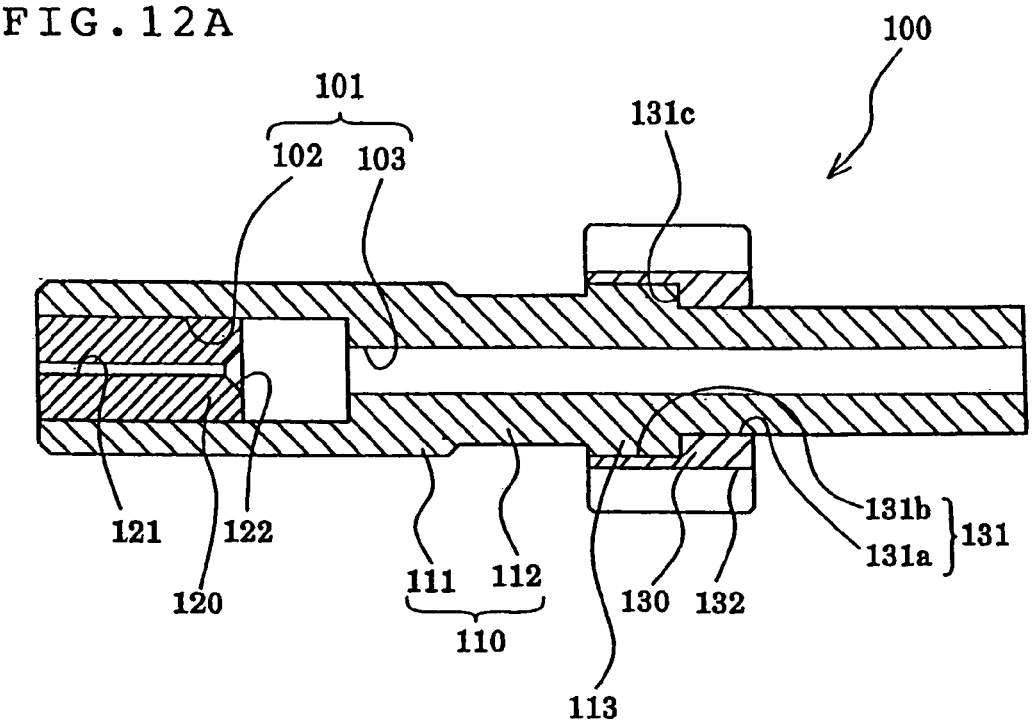
FIGS. 12A–12B are sectional views of a ferrule in the prior art.
Figure 12B:
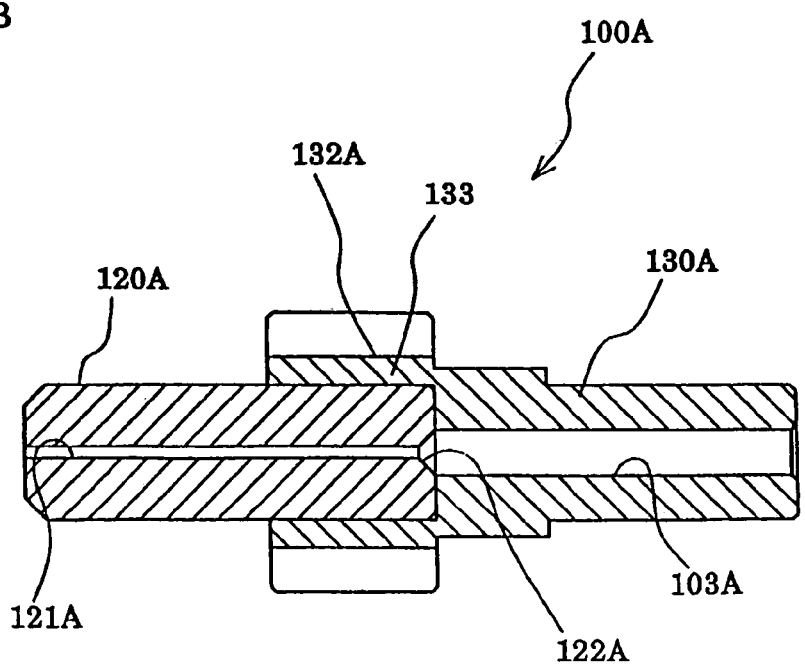

Each of FIGS. 10 and 11 shows one example in which the non-slip portion is arranged in the ferrule 10 of the above embodiment mode 1. FIGS. 10 and 11 are exploded perspective views of ferrules in accordance with other embodiment modes.

As shown in FIG. 10(a), a non-slip portion 25 constructed by a V-shaped groove is formed over the axial direction on the rear end portion side of the outer circumferential face of the cylindrical body 20C for the ferrule constituting the ferrule 10E.

A projecting portion 33 engaged with the non-slip portion 25 constructed by the groove of the cylindrical body 20C for the ferrule is arranged in a flange member 30D over the axial direction on the inner circumferential face of an insertion hole 31D.

Thus, the movements of the flange member 30D in the rotating direction and on the axial tip portion side with respect to the cylindrical body 20C for the ferrule are reliably regulated by arranging the non-slip portion 25 constructed by the groove on the outer circumferential face of the cylindrical body 20C for the ferrule, and also arranging the projecting portion 33 engaged with the non-slip portion 25 on the inner circumferential face of the flange member 30D.

Further, no non-slip portion is limited to this case. For example, as shown in FIG. 10(b), a non-slip portion 26 constructed by the groove of a spiral shape is formed on the outer circumferential face of the cylindrical body 20D for the ferrule constituting the ferrule 10F.

A flange member 30E is formed by outsert molding. The inner circumferential face of an insertion hole 31E of the flange member 30E is formed in a shape equal to that of the outer circumferential face of the cylindrical body 20D for the ferrule. Namely, a projecting portion 34 of a spiral shape is arranged on the inner circumferential face of the insertion hole 31E of the flange member 30E.

Thus, the movements of the flange member 30E in the rotating direction and the axial direction with respect to the cylindrical body 20D for the ferrule are reliably regulated by arranging the non-slip portion 26 constructed by the groove on the outer circumferential face of the cylindrical body 20D for the ferrule, and also arranging the projecting portion 34 engaged with the groove on the inner circumferential face of the flange member 30E.

Further, no non-slip portion is limited to this case. For example, as shown in FIG. 11, a convexo-concave face 27 for the non-slip is formed on the outer circumferential face of the cylindrical body 20E for the ferrule constituting the ferrule 10G by surface coarse processing such as blast processing, etc. and injection molding, etc.

Thus, the movements of the flange member 30 in the rotating direction and the axial direction with respect to the cylindrical body 20E for the ferrule are reliably regulated by arranging the convexo-concave face 27 on the outer circumferential face of the cylindrical body 20E for the ferrule.

Thus, the non-slip portions 25 to 27 are not particularly limited in shape, size, etc. if the movements of the flange members 30, 30D and 30E in the rotating direction and the axial direction are reliably regulated. In FIGS. 10 and 11, the non-slip portion is arranged in the ferrule 10 of the embodiment mode 1 as an example, but the movements in the rotating direction and the axial direction are reliably regulated by arranging the non-slip portion in each of the ferrules 10A, 10B and 10C of embodiment modes 2 to 4.

As explained above, in accordance with the ferrule of the present invention, since the ferrule is constructed by the cylindrical body for the ferrule and the flange member fixed to only the outer circumferential face of the cylindrical body for the ferrule, the flange member can be made light in weight and manufacture cost can be reduced.

What is claimed is:

1. A ferrule comprising: a cylindrical body constructed from a single piece of ceramic material consisting primarily of zirconia and having an outer circumferential surface, a substantially uniform outer diameter along an entire longitudinal axis of the cylindrical body with an outer diameter error of 2.0 μm or less, a first insertion hole bounded by a first inner surface of the cylindrical body and configured to receive therein a first preselected portion of an optical fiber so that the first preselected portion of the optical fiber is in direct contact with the first inner surface of the cylindrical body, and a second insertion hole disposed in communication with the first insertion hole and bounded by a second inner surface of the cylindrical body and configured to receive therein a second preselected portion of the optical fiber enclosed in a buffer coating so that the second preselected portion of the optical fiber is in direct contact with the second inner surface of the cylindrical body the first and second insertion holes forming part of a through-hole of the cylindrical body, the through-hole having an intermediate portion disposed between and in communication with the first and second insertion holes, the intermediate portion having a tapered surface converging toward the first insertion hole; and a flange member separate and independent from the cylindrical body and connected directly to the outer circumferential surface of the cylindrical body so as to be disposed only over the second insertion hole of the cylindrical body.

2. A ferrule according to claim 1; wherein the flange member is press-fitted to the outer circumferential surface of the cylindrical body.

3. A ferrule according claim 2; wherein the flange member is connected to a convexo-concave portion of the outer circumferential surface of the cylindrical body so that the flange member is in a non-slip state relative to the cylindrical body.

4. A ferrule according to claim 2; wherein the flange member is made of a plastic material.

5. A ferrule according to claim 2; wherein the cylindrical body comprises a cylindrical portion and a deformable adjusting portion arranged on at least one end side of the interior of the cylindrical portion and having a hardness lower than that of the cylindrical portion; and wherein a core center of a tip surface of the optical fiber becomes aligned with a center of the cylindrical portion upon deformation of the adjusting portion.

6. A ferrule according claim 1; wherein the flange member is connected to a convexo-concave portion of the outer circumferential surface of the cylindrical body so that the flange member is in a non-slip state relative to the cylindrical body.

7. A ferrule according to claim 1; wherein the flange member is made of a plastic material.

8. A ferrule according to claim 1; wherein the cylindrical body comprises a cylindrical portion and a deformable adjusting portion arranged on at least one end side of the interior of the cylindrical portion and having a hardness lower than that of the cylindrical portion; and wherein a core center of a tip surface of the optical fiber becomes aligned with a center of the cylindrical portion upon deformation of the adjusting portion.

9. A ferrule comprising: a first member constructed from a single piece of ceramic material consisting primarily of zirconia and having a first end, a second end, an outer surface disposed between the first and second ends, a substantially uniform outer diameter along an entire longitudinal axis of the first member with an outer diameter error of 2.0 μm or less, and a through-hole extending from the first end to the second end, the through-hole having a first portion bounded by a first inner surface of the first member and configured to receive therein a first preselected part of an optical fiber so that the first preselected part of the optical fiber is in direct contact with the first inner surface of the first member, a second portion disposed in communication with the first portion, the second portion being bounded by a second inner surface of the first member and configured to receive therein a second preselected part of the optical fiber enclosed in a buffer coating so that the second preselected part of the optical fiber is in direct contact with the second inner surface of the first member, and a third portion disposed between and in communication with the first and second portions, the third portion having a tapered surface converging toward the first portion; and a second member separate and independent from the first member and connected directly to a portion of the outer surface of the first member so that the second member is disposed only over the second portion of the through-hole of the first member.

10. A ferrule according to claim 9; wherein the second member is press-fitted to the outer surface of the first member.

11. A ferrule according to claim 9; wherein the second member comprises a flange having a plurality of grooves disposed around an outer circumferential surface thereof.

12. A ferrule comprising: a ferrule tubular body constructed from a single piece of ceramic material consisting primarily of zirconia and having a cylindrical outer surface, a substantially uniform outer diameter along an entire longitudinal axis of the tubular body with an outer diameter error of 2.0 µm or less, and a through-hole formed in the ferrule tubular body with a first portion having a diameter sufficient to receive and hold a first end portion of an optical fiber, a second portion having a second diameter greater than the first diameter and sufficient to receive and hold therein a second end portion of the optical fiber enclosed in a buffer coating and a third portion disposed between and in communication with the first and second portions, the third portion having a tapered surface converging toward the first portion, the ferrule tubular body having a front end portion having the first portion of the through-hole and a rear end portion having the second portion of the through-hole; and a flange member separate and independent from the ferrule tubular body and connected directly to the cylindrical outer surface of the ferrule tubular body so that the flange member is connected only to the rear end portion of the ferrule tubular body.

13. A ferrule according to claim 12; wherein the flange member is press-fitted to the outer surface of the ferrule tubular body.

14. A ferrule according claim 12; wherein the flange member is connected to a convexo-concave portion of the outer surface of the ferrule tubular body so that the flange member is in a non-slip state relative to the ferrule tubular body.

15. A ferrule according to claim 12; wherein the flange member is made of a plastic material.

16. A ferrule according to claim 12; wherein the ferrule tubular body comprises a cylindrical portion and a deformable adjusting portion arranged on at least one end side of the interior of the cylindrical portion and having a hardness lower than that of the cylindrical portion; and wherein a core center of a tip surface of the optical fiber becomes aligned with a center of the cylindrical portion upon deformation of the adjusting portion.

17. A ferrule comprising: a cylindrical body constructed from a single piece of ceramic material and having a first end, a second end, a tapered portion extending from the first end to a preselected portion of the cylindrical body along a longitudinal axis thereof, a cylindrical portion having an outer circumferential surface and a substantially uniform diameter along the entire longitudinal axis from the preselected portion to the second end, a first insertion hole bounded by a first inner surface of the cylindrical body and configured to receive therein a first preselected portion of an optical fiber so that the first preselected portion of the optical fiber is in direct contact with the first inner surface of the cylindrical body, and a second insertion hole disposed in communication with the first insertion hole and bounded by a second inner surface of the cylindrical body and configured to receive therein a second preselected portion of the optical fiber enclosed in a buffer coating so that the second preselected portion of the optical fiber is in direct contact with the second inner surface of the cylindrical body, the first and second insertion holes forming part of a through-hole of the cylindrical body, the through-hole having an intermediate portion disposed between and in communication with the first and second insertion holes, the intermediate portion having a tapered surface converging toward the first insertion hole; and a flange member separate and independent from the cylindrical body and connected directly only to the outer circumferential surface of the cylindrical portion of the cylindrical body so that the flange member is disposed only over the second insertion hole of the cylindrical body.

18. A ferrule according to claim 17; wherein the flange member is press fitted to the outer circumferential surface of the cylindrical portion of the cylindrical body.

19. A ferrule according to claim 17; wherein the flange member is made of a plastic material.

20. A ferrule according to claim 17; wherein the ceramic material consists primarily of zirconia.

21. A ferrule according to claim 20; wherein the outer diameter of the cylindrical portion of the cylindrical body has an outer diameter error of 2.0 µm or less.

22. A ferrule according to claim 17; wherein the outer diameter of the cylindrical portion of the cylindrical body has an outer diameter error of 2.0 µm or less.

* * * * *